(12) United States Patent
Liu et al.

(10) Patent No.: US 11,740,810 B2
(45) Date of Patent: Aug. 29, 2023

(54) MIRRORED MEMORY CONFIGURATION METHOD AND APPARATUS, AND COMPUTER STORAGE MEDIUM

(71) Applicant: Huawei Technologies Co., Ltd., Shenzhen (CN)

(72) Inventors: Gang Liu, Hangzhou (CN); Fei Zhang, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 113 days.

(21) Appl. No.: 17/451,569

(22) Filed: Oct. 20, 2021

(65) Prior Publication Data

US 2022/0035540 A1 Feb. 3, 2022

Related U.S. Application Data

(63) Continuation of application No. PCT/CN2020/072642, filed on Jan. 17, 2020.

(30) Foreign Application Priority Data

May 16, 2019 (CN) .......................... 201910411201.3

(51) Int. Cl.
  *G06F 12/00* (2006.01)
  *G06F 3/06* (2006.01)
  (Continued)

(52) U.S. Cl.
  CPC .......... *G06F 3/0629* (2013.01); *G06F 3/0614* (2013.01); *G06F 3/0673* (2013.01);
  (Continued)

(58) Field of Classification Search
  CPC .... G06F 3/0614; G06F 3/0673; G06F 9/4406; G06F 12/02; G06F 2212/1032
  See application file for complete search history.

(56) References Cited

U.S. PATENT DOCUMENTS

9,086,957 B2 * 7/2015 Cordero .............. G06F 12/0802
2009/0172323 A1 * 7/2009 Swanson ............. G06F 11/1666
  711/E12.103

(Continued)

FOREIGN PATENT DOCUMENTS

CN 102326149 A 1/2012
CN 103649923 A 3/2014

(Continued)

OTHER PUBLICATIONS

Wikipedia, "BIOS interrupt call", https://en.wikipedia.org/w/index.php?title=BIOS_interrupt_call&oldid=871058098, Nov. 28, 2018, from Wikipedia, 11 pages.

*Primary Examiner* — John A Lane
(74) *Attorney, Agent, or Firm* — Slater Matsil, LLP

(57) ABSTRACT

This application discloses a mirrored memory configuration method and apparatus, and a computer storage medium, and belongs to the field of information processing technologies. The method includes the following: After a computer apparatus is started, if the computer apparatus is currently in an OS state and obtains a mirrored memory establishment request, the computer apparatus may switch from the OS state to a BIOS state through system interruption. Then the computer apparatus configures a mirroring relationship in the BIOS state, and switches to the OS state again after configuring the mirroring relationship, to reconfigure a mirrored memory.

12 Claims, 7 Drawing Sheets

(51) Int. Cl.
*G06F 9/4401* (2018.01)
*G06F 12/06* (2006.01)

(52) U.S. Cl.
CPC ........ *G06F 9/4406* (2013.01); *G06F 12/0646* (2013.01); *G06F 2212/1032* (2013.01)

(56) References Cited

U.S. PATENT DOCUMENTS

| | | |
|---|---|---|
| 2010/0211824 A1 | 8/2010 | Agrawal et al. |
| 2017/0185340 A1* | 6/2017 | Xie ........................ G06F 3/0604 |
| 2017/0277468 A1 | 9/2017 | Nakayama |
| 2018/0188966 A1* | 7/2018 | Jayakumar .......... G06F 11/2056 |

FOREIGN PATENT DOCUMENTS

| | | |
|---|---|---|
| CN | 104252419 A | 12/2014 |
| CN | 105528262 A | 4/2016 |
| CN | 106598692 A | 4/2017 |
| CN | 110262893 A | 9/2019 |
| EP | 3171276 A1 | 5/2017 |
| EP | 3343374 A2 | 7/2018 |

* cited by examiner

MIRRORED MEMORY CONFIGURATION METHOD AND APPARATUS, AND COMPUTER STORAGE MEDIUM

CROSS-REFERENCE TO RELATED APPLICATIONS

This application is a continuation of International Application No. PCT/CN2020/072642, filed on Jan. 17, 2020, which claims priority to Chinese Patent Application No. 201910411201.3, filed on May 16, 2019. The disclosures of the aforementioned applications are hereby incorporated by reference in their entireties.

TECHNICAL FIELD

This application relates to the field of information processing technologies, and in particular, to a mirrored memory configuration method and apparatus, and a computer storage medium.

BACKGROUND

A mirrored memory means the following: Two independent physical memory spaces are set to be in a mirroring relationship, a virtual mirrored memory space is configured for the two physical memory spaces, and a corresponding memory address range is allocated to the mirrored memory space, so that a computer apparatus can access the mirrored memory space by using the memory address range. The two physical memory spaces have a same capacity, and a capacity of the mirrored memory space is the same as the capacity of one of the physical memory spaces. When the computer apparatus subsequently writes data into the mirrored memory space, the data is actually simultaneously written into the two physical memory spaces, to implement hot backup of the data.

In a related technology, a hardware resource is initialized in a process of starting the computer apparatus, for example, a mirrored memory is configured. However, the configured mirrored memory cannot be changed after the computer apparatus is started, and consequently, flexibility of configuring a mirrored memory is relatively poor in the related technology.

SUMMARY

This application provides a mirrored memory configuration method and apparatus, and a computer storage medium, to improve flexibility of configuring a mirrored memory. Technical solutions are as follows.

According to a first aspect, a mirrored memory configuration method is provided. The method is applied to a computer apparatus. The method includes: obtaining a mirrored memory establishment request, where the mirrored memory establishment request carries a first identifier of a first physical memory space and a second identifier of a second physical memory space; switching a current state of the computer apparatus from an operating system (OS) state to a basic input/output system (BIOS) state through system interruption; configuring the first physical memory space and the second physical memory space to be in a mirroring relationship; obtaining an identifier of a mirrored memory space corresponding to the first physical memory space and the second physical memory space; switching the current state of the computer apparatus from the BIOS state to the OS state; and allocating a memory address space to the mirrored memory space based on the identifier of the mirrored memory space.

In this embodiment of this application, a BIOS and an OS are installed in the computer apparatus. When the BIOS runs, the computer apparatus is in the BIOS state. When the OS runs, the computer apparatus is in the OS state. After the computer apparatus is started, if the computer apparatus is currently in the OS state and obtains the mirrored memory establishment request, the computer apparatus may switch from the OS state to the BIOS state through system interruption, for example, by using a system management interrupt (SMI) signal. Then the computer apparatus configures the mirroring relationship in the BIOS state, and switches to the OS state again after configuring the mirroring relationship, to reconfigure a mirrored memory. In the entire process, the computer apparatus does not need to be restarted. In this way, in a process of reconfiguring the mirrored memory, a service in the OS state does not need to be interrupted, thereby improving flexibility of configuring a mirrored memory.

Optionally, before the switching a current state of the computer apparatus from an OS state to a BIOS state through system interruption, the method further includes: performing an offline operation on a memory address range corresponding to the first physical memory space.

In this embodiment of this application, if the first physical memory space used to configure a mirrored memory has a corresponding memory address range, that is, the first physical memory space is used by a processor, the offline operation needs to be first performed, before the mirroring relationship is configured, on the memory address range corresponding to the first physical memory space; or if the offline operation is not performed, before the mirroring relationship is configured, on the memory address range corresponding to the first physical memory space, the mirrored memory cannot be successfully configured.

Optionally, the method further includes: receiving a mirrored memory expansion request, where the mirrored memory expansion request carries the identifier of the mirrored memory space; performing an offline operation on the memory address range corresponding to the mirrored memory space; switching the current state of the computer apparatus from the OS state to the BIOS state through system interruption; and terminating the mirroring relationship between the first physical memory space and the second physical memory space.

In this embodiment of this application, after the computer apparatus is started, if the computer apparatus is currently in the OS state and needs to re-delete the mirrored memory, the computer apparatus may switch to the BIOS state. Then the computer apparatus terminates the mirroring relationship in the BIOS state to reconfigure a mirrored memory. In the entire process, the computer apparatus does not need to be restarted. In this way, in a process of reconfiguring the mirrored memory, a service in the OS state does not need to be interrupted, thereby improving flexibility of configuring a mirrored memory.

Optionally, after the terminating the mirroring relationship between the first physical memory space and the second physical memory space, the method further includes: generating a memory report message, where the memory report message carries the identifier of the first physical memory space; and allocating the memory address range to the first physical memory space based on the memory report message.

After terminating the mirroring relationship, the computer apparatus in the BIOS state may further report, to the computer apparatus in the OS state, the first physical memory space obtained after the mirroring relationship is terminated, so that the computer apparatus in the OS state can reuse the first physical memory space, thereby further improving flexibility of configuring a mirrored memory.

According to a second aspect, a mirrored memory configuration apparatus is provided, and the mirrored memory configuration apparatus has a function of implementing behavior of the mirrored memory configuration method in the first aspect. The mirrored memory configuration apparatus includes at least one module, and the at least one module is configured to implement the mirrored memory configuration method provided in the first aspect.

According to a third aspect, a computer apparatus is provided. A structure of the computer apparatus includes a processor and a memory. The memory is configured to store a program that supports a mirrored memory configuration apparatus in performing the mirrored memory configuration method provided in the first aspect, and store data used to implement the mirrored memory configuration method provided in the first aspect. The processor is configured to execute the program stored in the memory. An operation apparatus of the computer apparatus may further include a communications bus, and the communications bus is configured to establish a connection between the processor and the memory.

According to a fourth aspect, a computer storage medium is provided, and the computer storage medium stores instructions. When the instructions run on a computer, the computer is enabled to perform the mirrored memory configuration method in the first aspect.

According to a fifth aspect, a computer program product including instructions is provided. When the computer program product runs on a computer, the computer is enabled to perform the mirrored memory configuration method in the first aspect.

DETAILED DESCRIPTION OF ILLUSTRATIVE EMBODIMENTS

To make the objectives, technical solutions, and advantages of this application clearer, the following further describes implementations of this application in detail with reference to accompanying drawings.

Before a mirrored memory configuration method provided in the embodiments of this application is explained and described, an application scenario related to the embodiments of this application is first briefly described. Currently, a computer apparatus may support two types of mirrored memories. One type is full mirroring, that is, the computer apparatus divides all physical memory spaces into two parts, and configures a mirrored memory by using the two parts of physical memory spaces. In this case, it is equivalent to that the computer apparatus sacrifices half of the physical memory space to configure the mirrored memory. The other type is partial mirroring, that is, the computer apparatus uses some physical memory spaces to configure a mirrored memory. In this case, the computer apparatus sacrifices only some physical memory spaces to configure the mirrored memory, which is more flexible. The mirrored memory configuration method provided in the embodiments of this application is mainly applied to the second case, so that the computer apparatus can dynamically adjust a mirrored memory in an OS state.

Figure 1:
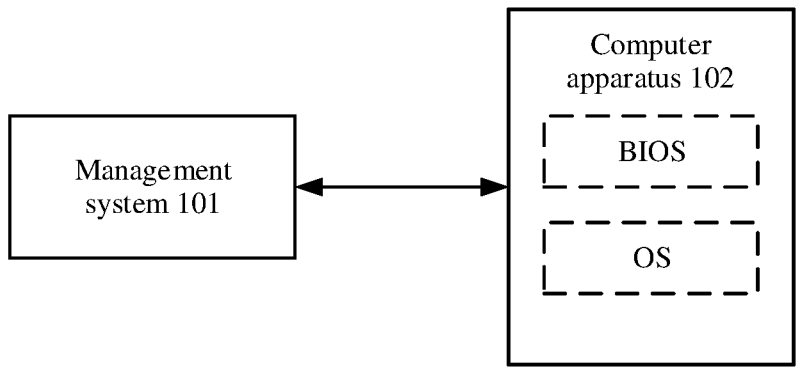
FIG. 1 is a schematic diagram of a mirrored memory configuration system according to an embodiment of this application.

FIG. 1 is a schematic diagram of a mirrored memory configuration system according to an embodiment of this application. As shown in FIG. 1, the system 100 includes a management system 101 and a computer apparatus 102. The management system 101 and the computer apparatus 102 communicate with each other in a wired or wireless manner. The computer apparatus may be a device such as a server.

A BIOS and an OS are deployed in the computer apparatus 102. The computer apparatus may run the BIOS, and may also run the OS. In a process of starting the computer apparatus, the BIOS first runs to initialize a hardware resource, for example, configure a mirrored memory. Then the OS runs to run various services by using the initialized hardware resource. When the computer apparatus runs the BIOS, it is referred to that the computer apparatus is in a BIOS state. When the computer apparatus runs the OS, it is referred to that the computer apparatus is in an OS state. The management system 101 may interact with the computer apparatus 102 to manage the computer apparatus 102, for example, enable the computer apparatus 102 to configure a mirrored memory in the OS state. A specific implementation is described in the following embodiments, and details are not described herein first.

In addition, the management system 101 may be a device independent of the computer apparatus 102, for example, another computer apparatus independent of the computer apparatus 102. Alternatively, the management system 101 may be a control chip, and is integrated into the computer apparatus 102. An instruction for implementing a management system function is configured in the control chip. In addition, the management system 101 may provide an access interface to the outside. The access interface may be software or a web page, so that an operator can access the management system by using the software or the web page, to control the computer apparatus.

Figure 2:
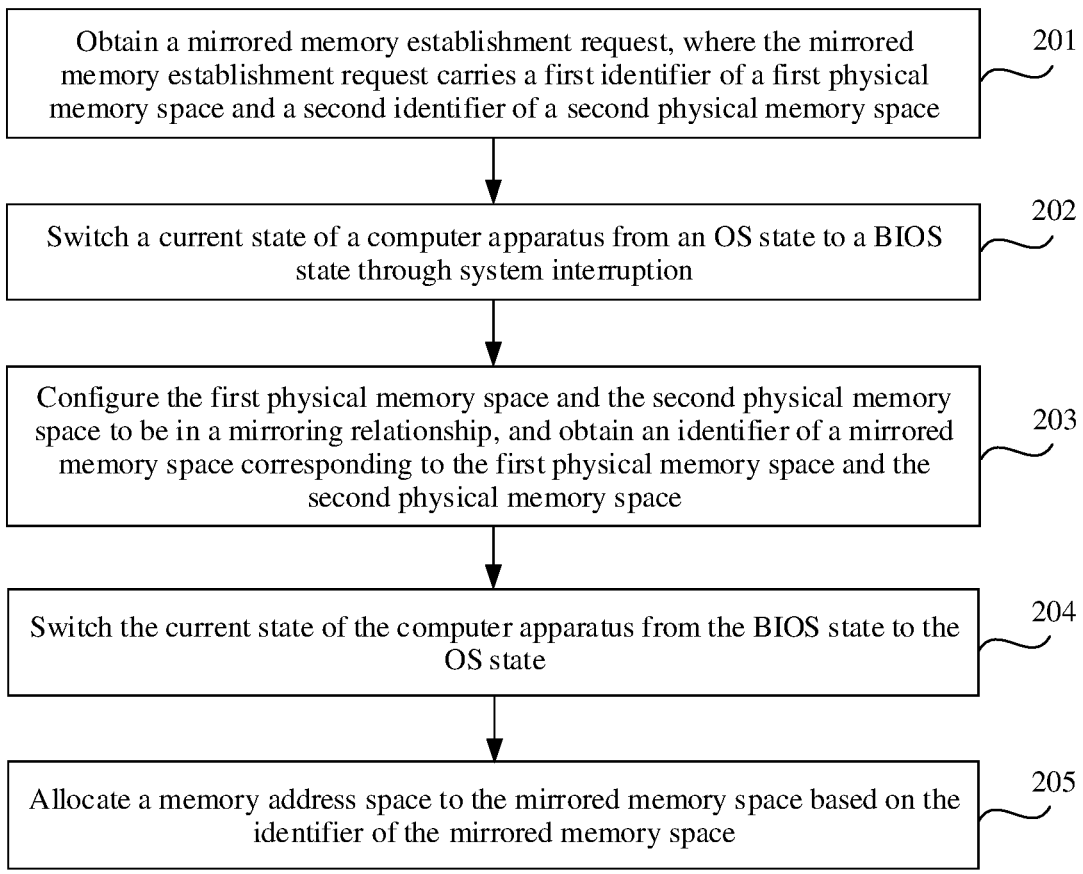
FIG. 2 is a flowchart of a mirrored memory configuration method according to an embodiment of this application.

FIG. 2 is a flowchart of a mirrored memory configuration method according to an embodiment of this application. The method is applied to a computer apparatus. As shown in FIG. 2, the method includes the following steps.

Step 201: Obtain a mirrored memory establishment request, where the mirrored memory establishment request carries a first identifier of a first physical memory space and a second identifier of a second physical memory space.

The mirrored memory establishment request in step 201 may be sent by a management system to the computer apparatus, or may be initiated by the computer apparatus in an OS state.

When the mirrored memory establishment request in step 201 is sent by the management system to the computer apparatus, the computer apparatus may receive, in the following two possible implementations, the mirrored memory establishment request sent by the management system.

In a first possible implementation, when detecting a mirroring operation initiation instruction, the management system sends the mirrored memory establishment request to the computer apparatus in the OS state. The mirroring operation initiation instruction may be triggered by using a preset operation by an operator corresponding to the management system. In this case, the mirroring operation initiation instruction may carry the first identifier used for the first physical memory space and the second identifier used for the second physical memory space.

In a second possible implementation, when the computer apparatus is in the OS state and detects a mirroring operation initiation instruction, because a physical memory space is invisible to a processor when the computer apparatus is in the OS state, the computer apparatus needs to send a mirroring operation initiation request to the management system, to indicate the management system to send the mirrored memory establishment request based on the mirroring operation initiation request. The mirroring operation initiation request carries an identifier of each of two memory address ranges used to establish a mirrored memory. When receiving the mirroring operation initiation request, the management system determines a physical memory space corresponding to each memory address range, to send, to the computer apparatus, the mirrored memory establishment request carrying the first identifier of the first physical memory space and the second identifier of the second physical memory space. It should be noted that in an implementation of this application, the computer apparatus in the OS state may automatically trigger a mirrored memory establishment process by using a running program or the like, and it is not required that the computer apparatus sends the mirrored memory initiation request to the management system and that the management system then sends the mirrored memory establishment request. This is not limited in this application.

In the second possible implementation, the mirroring operation initiation instruction may further carry an identifier of a memory address range. In this case, the computer apparatus may divide the memory address range into two memory address ranges of a same size, to send the mirroring operation initiation request to the management system based on an identifier of each of the two memory address ranges obtained after division. In other words, the mirroring operation initiation request carries the identifier of each of the two memory address ranges obtained after division.

When the mirrored memory establishment request in step 201 is initiated by the computer apparatus in the OS state, an implementation in which the computer apparatus initiates the mirrored memory establishment request may be as follows: When detecting a mirroring operation initiation instruction, the computer apparatus in the OS state determines each of two memory address ranges used to establish a mirrored memory, and then determines, based on each of the two memory address ranges, each of two physical memory spaces used to establish a mirrored memory, to initiate the mirrored memory establishment request carrying the first identifier of the first physical memory space and the second identifier of the second physical memory space.

In this embodiment of this application, the physical memory space may be a physical memory module, for example, may be a dual inline memory module (DIMM). The physical memory space may be a physical memory riser, or may be some memory spaces in a physical memory module. This is not specifically limited herein in this embodiment of this application.

Step 202: Switch a current state of the computer apparatus from an OS state to a BIOS state through system interruption.

Rights of use of an OS and a BIOS are mutually exclusive to a processor of the computer apparatus. Therefore, in this embodiment of this application, to enable the computer apparatus to adjust a mirrored memory when continuing to run the OS, the computer apparatus can switch from the OS state to the BIOS state through system interruption after being started. In other words, the computer apparatus can switch between running the OS and running the BIOS.

For example, in a process in which the computer apparatus runs the OS, if a system management interrupt signal is triggered in the computer apparatus, the processor in the computer apparatus stores a currently processed service (including various services running in the OS), and wakes up another independent operating system BIOS, so that the computer apparatus switches to run the BIOS state. After completing a required operation, the computer apparatus in the BIOS state executes a resume (RSM) instruction. The RSM instruction triggers the computer apparatus to return to the operating system before switching, that is, return to the OS state, and enables the processor to reload the various services that are previously stored, to resume the various services that are temporarily interrupted. Therefore, in this embodiment of this application, the system management interrupt signal may be used to implement switching of the computer apparatus from the OS state to the BIOS state, so that a service running in the OS state is not disabled after the computer apparatus switches to the BIOS state.

In other words, in this embodiment of this application, the computer apparatus switches between running the OS and running the BIOS in two switching modes. One switching mode is switching from the BIOS state to the OS state by using the system management interrupt signal, to avoid restarting a computer status to switch from the OS state to the BIOS state. The other switching mode is switching from the OS state to the BIOS state by actively triggering the RSM instruction.

In addition, an implementation of triggering the system management interrupt signal in the computer apparatus may be as follows: The computer apparatus registers a fragment clock in an underlying clock chip. If a current time reaches a specified time point in the fragment clock, the computer apparatus automatically generates the system management interrupt signal. In other words, the computer apparatus may trigger the system management interrupt signal by using a fragment clock technology.

Step 203: Configure the first physical memory space and the second physical memory space to be in a mirroring relationship, and obtain an identifier of a mirrored memory space corresponding to the first physical memory space and the second physical memory space.

For ease of subsequent description, the mirrored memory space corresponding to the first physical memory space and the second physical memory space is referred to as a first mirrored memory space. The mirrored memory space is a virtual memory space.

In addition, in this embodiment of this application, to implement interaction between the OS and the BIOS in the computer apparatus, a message, a request, or the like generated by the computer apparatus in a state may be placed at a preset storage location. After switching to another state, the computer apparatus may perform a corresponding operation based on the message or the request at the storage location. This is equivalent to that the OS and the BIOS in the computer apparatus interact with each other. Therefore, after obtaining the identifier of the first mirrored memory space, the computer apparatus may further generate and store a first memory mirroring message. The first memory mirroring message carries the identifier of the first mirrored memory space.

In addition, when the computer apparatus obtains the mirrored memory establishment request by using step 201, in the two physical memory spaces used to establish a mirrored memory, one or two physical memory spaces may have a corresponding memory address range, that is, the one or two physical memory spaces are used by the computer apparatus in the OS state; or one or two physical memory spaces may be mirrored memories of another physical memory space; or one or two physical memory spaces are physical memory spaces that are re-added in the computer apparatus. Therefore, in this embodiment of this application, when obtaining the mirrored memory establishment request, the computer apparatus needs to first perform, before performing step 202, an offline (offline) operation on memory address ranges corresponding to the two physical memory spaces. The performing the offline operation on the memory address range corresponding to the physical memory space is migrating data stored in the memory address range, and terminating a mapping relationship between the physical memory space and the memory address range. After terminating the mapping relationship, the computer apparatus cannot access the physical memory space by using the memory address range. Correspondingly, a process of configuring the memory address range for the physical memory space may also be referred to as an online operation.

Therefore, the performing the offline operation on the memory address ranges corresponding to the two physical memory spaces may be separately described in the following several scenarios.

In a first scenario, one of the two physical memory spaces used to establish a mirrored memory has a corresponding memory address range. It is assumed that the first physical memory space has a corresponding memory address range.

An implementation of performing the offline operation on the memory address range corresponding to the first physical memory space may be switching the computer apparatus from the current BIOS state to the OS state. After switching to the OS state, the computer apparatus performs the offline operation on the memory address range corresponding to the first physical memory space, and then switches from the OS state to the BIOS state by using the system management interrupt signal, to configure the two physical memory spaces to be in the mirroring relationship by using step 203.

Specifically, if the first physical memory space has the corresponding memory address range, the computer apparatus may generate and store a first memory offline request before switching from the BIOS state to the OS state. The first memory offline request carries the identifier of the first physical memory space. Then the computer apparatus obtains the first memory offline request after switching from the BIOS state to the OS state; performs, based on the first memory offline request, the offline operation on the memory address range corresponding to the first physical memory space; and generates and stores a first offline success message. The first offline success message carries the identifier of the first physical memory space. Correspondingly, after switching to the BIOS state, the computer apparatus may obtain the first offline success message, and determine, based on the identifier of the first physical memory space carried in the first offline success message, that the first physical memory space is currently unoccupied by the processor. Therefore, the computer apparatus may configure the first physical memory space and the second physical memory space to be in the mirroring relationship.

Figure 3:
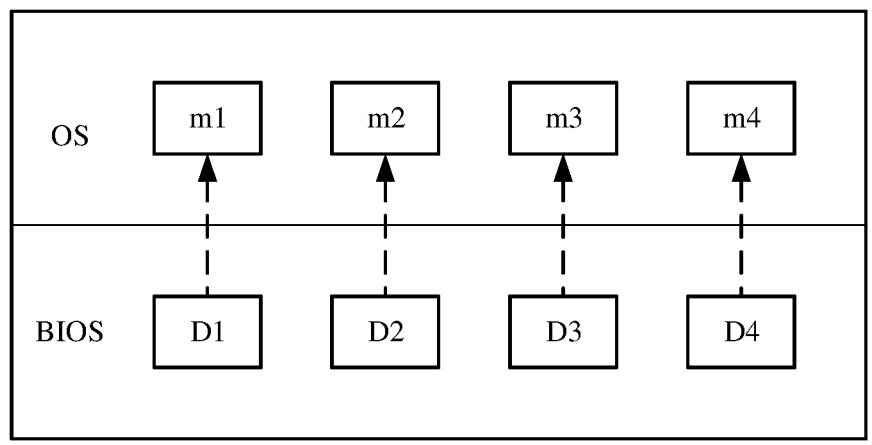
FIG. 3 is a schematic diagram of a mapping relationship between a physical memory space and a memory address according to an embodiment of this application.

The foregoing implementation is merely for the first physical memory space in the two physical memory spaces used to configure a mirrored memory. If the two physical memory spaces both meet the first scenario, the memory address ranges corresponding to the two physical memory spaces both may be put offline in the foregoing implementation, to facilitate subsequent configuration of a mirrored memory. For example, FIG. 3 is a schematic diagram of a mapping relationship between a physical memory space and a memory address according to an embodiment of this application. There are four physical memory spaces, respectively marked as D1, D2, D3, and D4. A memory address range corresponding to D1 is m1, a memory address range corresponding to D2 is m2, a memory address range corresponding to D3 is m3, and a memory address range corresponding to D4 is m4. Assuming that the mirrored memory establishment request carries identifiers of D1 and D2, the computer apparatus needs to first perform the offline operation on m1 corresponding to D1 and m2 corresponding to D2.

Figure 4:
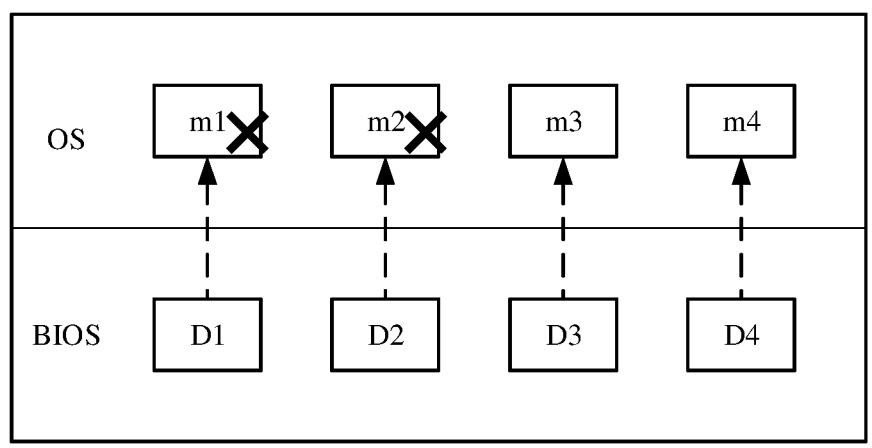
FIG. 4 is a schematic diagram of another mapping relationship between a physical memory space and a memory address according to an embodiment of this application.

FIG. 4 is a schematic diagram of another mapping relationship between a physical memory space and a memory address according to an embodiment of this application. As shown in FIG. 4, after the computer apparatus in the OS state performs the offline operation on m1 corresponding to D1 and m2 corresponding to D2, the memory address ranges m1 and m2 have no corresponding physical memory space.

Figure 5:
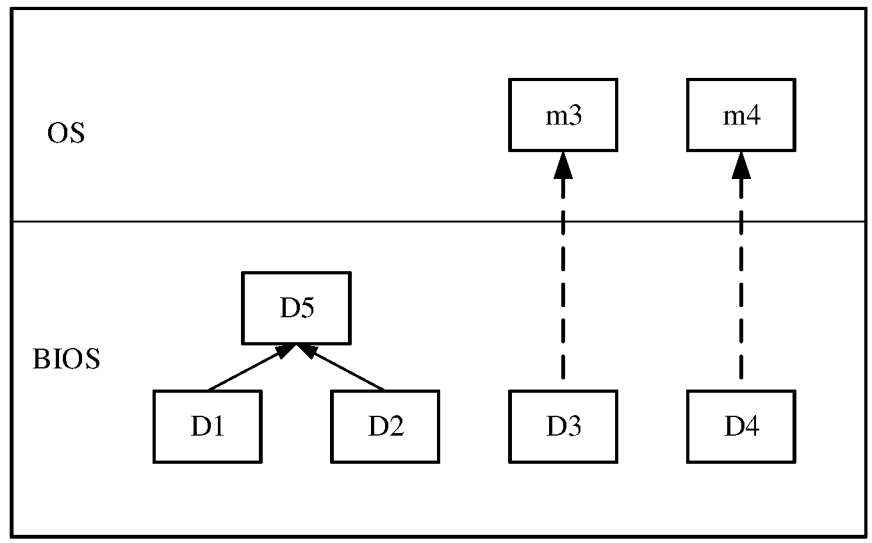
FIG. 5 is a schematic diagram of another mapping relationship between a physical memory space and a memory address according to an embodiment of this application.

FIG. 5 is a schematic diagram of another mapping relationship between a physical memory space and a memory address according to an embodiment of this application. As shown in FIG. 5, after the computer apparatus in the OS state performs the offline operation on m1 corresponding to D1 and m2 corresponding to D2, the computer apparatus in the BIOS state regenerates a mirrored memory space D5 for D1 and D2.

In addition, if the mirrored memory establishment request in step 201 is implemented by sending the mirroring operation initiation request to the management system by the computer apparatus in the OS state, before sending the mirroring operation initiation request to the management system, the computer apparatus may further perform the offline operation on each of the two memory address ranges, so that the computer apparatus in the BIOS state can subsequently directly establish a mirrored memory.

In a second scenario, one or two of the physical memory spaces used to establish a mirrored memory are mirrored memories of another physical memory space.

If the first physical memory space in the two physical memory spaces and the third physical memory space are in the mirroring relationship with each other, the first physical memory space and the third physical memory space correspond to a second mirrored memory space, and the third physical memory space is a physical memory space other than the first physical memory space and the second physical memory space, an implementation in which the computer apparatus performs the offline operation on the memory address range corresponding to the first physical memory space may be as follows: The computer apparatus switches from the BIOS state to the OS state; and after switching to the OS state, performs the offline operation on a memory address range corresponding to the first mirrored memory space, and then switches from the OS state to the BIOS state. After switching to the BIOS state, the computer apparatus configures the first physical memory space and the second physical memory space to be in the mirroring relationship.

Specifically, before switching from the BIOS state to the OS state, the computer apparatus generates and stores a second memory offline request. The second memory offline request carries an identifier of the second mirrored memory space. Correspondingly, after switching from the BIOS state to the OS state, the computer apparatus obtains the second memory offline request; performs, based on the second memory offline request, the offline operation on a memory address range corresponding to the second mirrored memory space; and generates and stores a second offline success message. The second offline success message carries the identifier of the second physical memory space. Correspondingly, after switching to the BIOS state, the computer apparatus may obtain the second offline success message, terminate the mirroring relationship between the first physical memory space and the third physical memory space based on the second offline success message, and then configure the first physical memory space and the second physical memory space to be in the mirroring relationship.

Similarly, the foregoing implementation is merely for one physical memory space. If the two physical memory spaces meet the second scenario, the memory address ranges corresponding to the two physical memory spaces may be put offline in the foregoing implementation, to facilitate subsequent configuration of a mirrored memory.

In addition, in the second scenario, if the mirrored memory establishment request in step 201 is implemented by sending the mirroring operation initiation request to the management system by the computer apparatus in the OS state, before sending the mirroring operation initiation request to the management system, the computer apparatus may first perform the offline operation on the memory address range corresponding to the second mirrored memory space, so that the computer apparatus in the BIOS state can subsequently directly terminate the mirroring relationship between the first physical memory space and the second physical memory space, and establish a new mirrored memory. Details are not described herein.

In a third scenario, one or two of the two physical memory spaces used to establish a mirrored memory are physical memory spaces that are re-added in the computer apparatus.

In the third scenario, a memory address range has not been allocated to the physical memory space that is re-added in the computer apparatus. Therefore, in the third scenario, the offline operation does not need to be performed on the physical memory space that is re-added in the computer apparatus, and the mirroring relationship is directly configured based on step 203.

It should be noted that for the two physical memory spaces used to establish a mirrored memory, there may be a case in which the two physical memory spaces belong to different scenarios. In this case, a corresponding operation only needs to be performed based on a corresponding scenario, and it is only required to ensure that neither of the two physical memory spaces has a corresponding memory address range before the computer apparatus configures the two physical memory spaces to be in the mirroring relationship.

Step 204: Switch the current state of the computer apparatus from the BIOS state to the OS state.

It can be learned from step 202 that after completing a corresponding operation in the BIOS state, the computer apparatus may automatically execute the RSM instruction. The RSM instruction triggers the computer apparatus to return to the OS state.

Step 205: Allocate a memory address space to the mirrored memory space based on the identifier of the mirrored memory space.

Based on an implementation of step 203, it can be learned that after obtaining the identifier of the first mirrored memory space, the computer apparatus generates and stores the first memory mirroring message. Therefore, an implementation of step 205 may be as follows: The computer apparatus obtains the first memory mirroring message, and allocates the memory address range to the first mirrored memory space based on the identifier of the first mirrored memory space carried in the first memory mirroring message.

Figure 6:
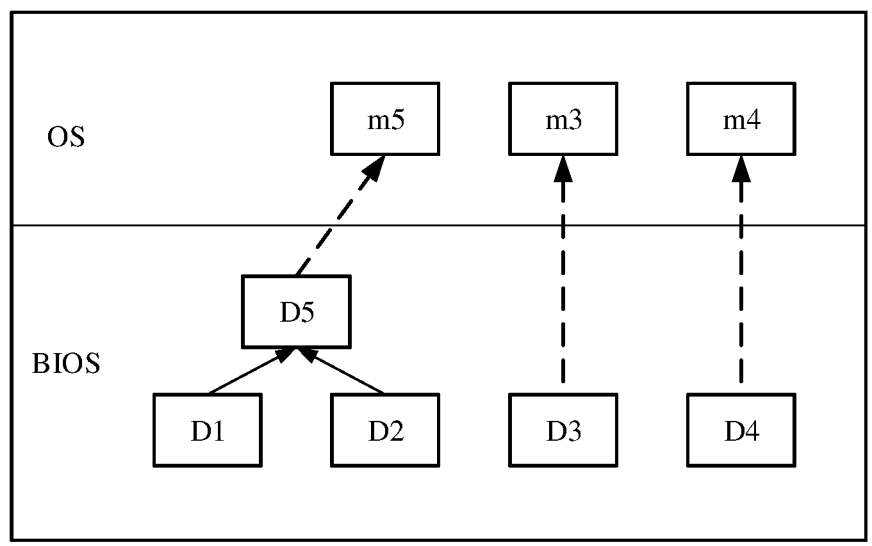
FIG. 6 is a schematic diagram of another mapping relationship between a physical memory space and a memory address according to an embodiment of this application.

FIG. 6 is a schematic diagram of another mapping relationship between a physical memory space and a memory address according to an embodiment of this application. As shown in FIG. 6, after switching to the OS state, the computer apparatus may allocate a memory address space m5 to the mirrored memory space D5, and the processor of the computer apparatus may subsequently simultaneously write data into the two physical memory spaces D1 and D2 by using m5.

In addition, when the physical memory space is a physical memory riser, if the physical memory riser is no longer used after a memory address range corresponding to the physical memory riser is put offline, the physical memory riser may be powered off. If a new physical memory riser is replaced after the power-off, the new physical memory riser needs to be powered on to initialize or perform self-test on the memory riser, to facilitate subsequent configuration of a mirrored memory.

In addition, before configuring two physical memory spaces to be in the mirroring relationship, the computer apparatus may further analyze related parameters of the two physical memory spaces. After determining that the two physical memory spaces meet a standard of a mirrored memory, the computer apparatus performs the step of configuring the two physical memory spaces to be in the mirroring relationship, to avoid a configuration error. The parameters related to the physical memory space include parameters such as a capacity and a frequency.

In this embodiment of this application, the computer apparatus may switch between running the BIOS and running the OS. Therefore, after the computer apparatus is started, if the computer apparatus is currently in the OS state and needs to reconfigure a mirrored memory, the computer apparatus may switch to the BIOS state by using the system management interrupt signal. Then the computer apparatus configures the mirroring relationship in the BIOS state, and switches to the OS state again after configuring the mirroring relationship, to reconfigure the mirrored memory. In the entire process, the computer apparatus does not need to be restarted. In this way, in a process of reconfiguring the mirrored memory, a service in the OS state does not need to be interrupted, thereby improving flexibility of configuring a mirrored memory.

The computer apparatus may reconfigure a mirrored memory in the OS state by using step 201 to step 204, and may further cancel a configured mirrored memory in the OS state in this embodiment of this application. This is explained in the following embodiment.

Figure 7:
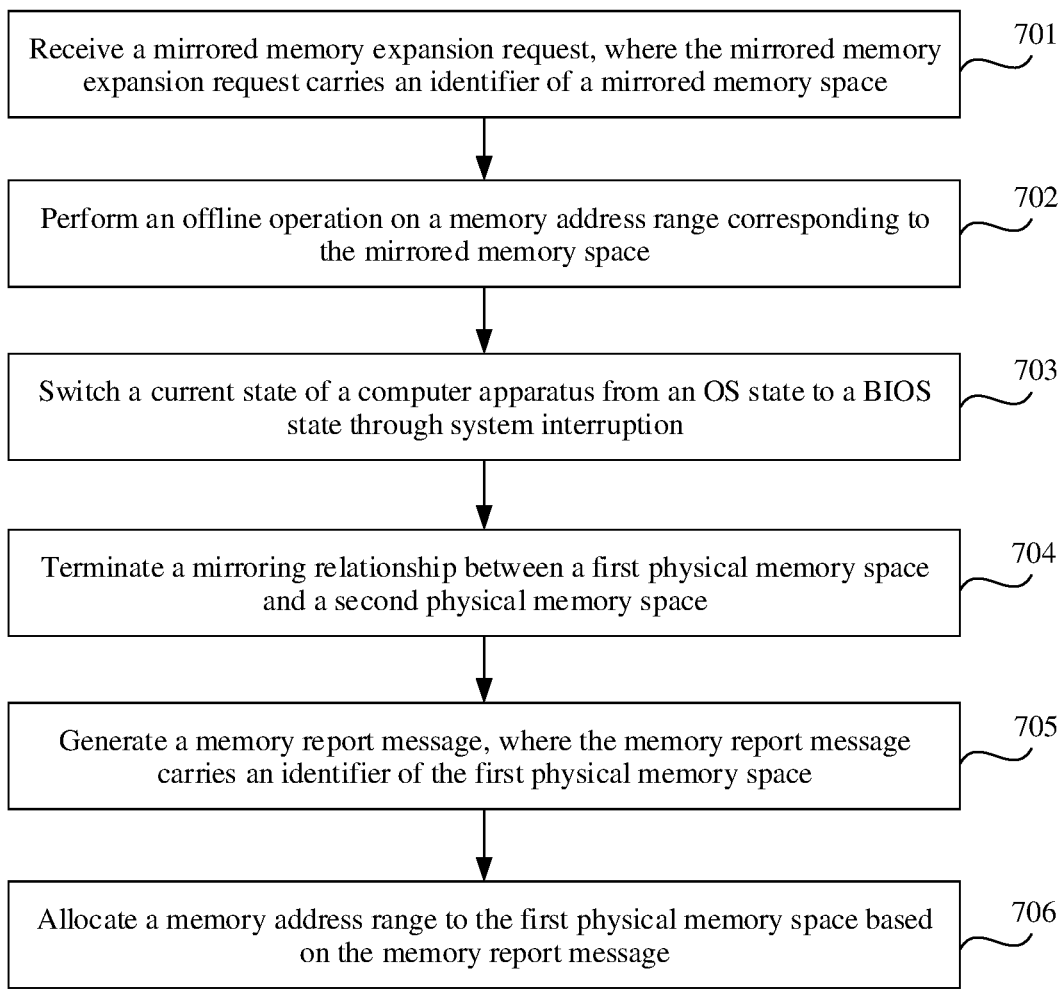
FIG. 7 is a flowchart of another mirrored memory configuration method according to an embodiment of this application.

FIG. 7 is a flowchart of another mirrored memory configuration method according to an embodiment of this application. The method is applied to a computer apparatus. As shown in FIG. 7, the method includes the following steps.

Step 701: Obtain a mirrored memory expansion request, where the mirrored memory expansion request carries an identifier of a mirrored memory space.

The mirrored memory expansion request may be sent by a management system to the computer apparatus, or may be initiated by the computer apparatus in an OS state.

When the mirrored memory expansion request in step 701 is sent by the management system to the computer apparatus, the computer apparatus may receive, in the following two possible implementations, the mirrored memory expansion request sent by the management system.

In a first possible implementation, when detecting a mirror expansion instruction, the management system sends the mirrored memory expansion request to the computer apparatus in the OS state. The mirror expansion instruction may be triggered by using a preset operation by an operator corresponding to the management system. The mirror expansion instruction may carry an identifier of each of two physical memory spaces used to expand a mirror. The management system may determine an identifier of a first mirrored memory space based on the identifier carried in the mirror expansion instruction, to send the mirrored memory expansion request to the computer apparatus. Certainly, the mirror expansion instruction may directly carry an identifier of a mirrored physical memory space corresponding to the two physical memory spaces used to expand a mirror.

In a second possible implementation, when the computer apparatus is in the OS state and detects a mirror expansion instruction, the computer apparatus forwards the mirror expansion instruction to the management system, to indicate the management system to send the mirrored memory expansion request to the computer apparatus. The mirroring operation expansion instruction carries identifiers of mirrored memory address ranges corresponding to two memory address ranges used for expansion. Similarly, the management system may determine the identifier of the first mirrored memory space based on the identifier carried in the mirror expansion instruction, to send the mirrored memory expansion request to the computer apparatus.

In addition, when the mirrored memory expansion request in step 701 is initiated by the computer apparatus in the OS state, an implementation in which the computer apparatus initiates the mirrored memory expansion request may be as follows: When detecting a mirror expansion instruction, the computer apparatus in the OS state determines an identifier of a mirrored memory space for expansion, and then initiates the mirrored memory expansion request based on the identifier of the mirrored memory space.

Step 702: Perform an offline operation on a memory address range corresponding to the mirrored memory space.

Assuming that a mirrored memory to be expanded in step 701 is a first mirrored memory corresponding to the first physical memory space and the second physical memory space in step 201, after performing the offline operation on the memory address range corresponding to the first mirrored memory space based on step 702, the computer apparatus generates and stores a third offline success message. The third offline success message carries the identifier of the first mirrored memory space.

Step 703: Switch a current state of the computer apparatus from an OS state to a BIOS state by using a system management interrupt signal.

For an implementation of step 703, refer to an implementation of step 202 in the embodiment in FIG. 2, and details are not described herein again.

Step 704: Terminate a mirroring relationship between a first physical memory space and a second physical memory space.

After switching from the current OS state to the BIOS state, the computer apparatus may obtain the third offline success message stored in step 702, and may terminate the mirroring relationship between the two physical memory spaces based on the identifier of the first mirrored memory space carried in the third offline success message.

Figure 8:
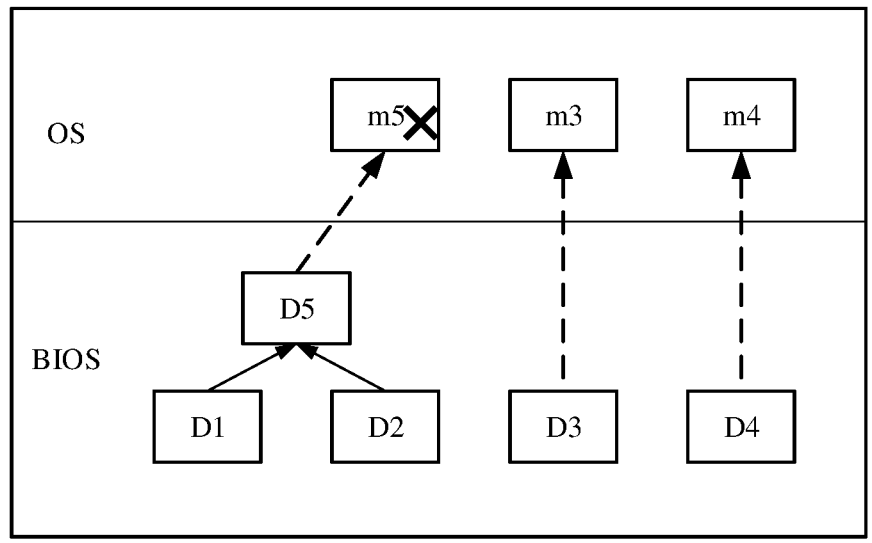
FIG. 8 is a schematic diagram of another mapping relationship between a physical memory space and a memory address according to an embodiment of this application.
Figure 9:
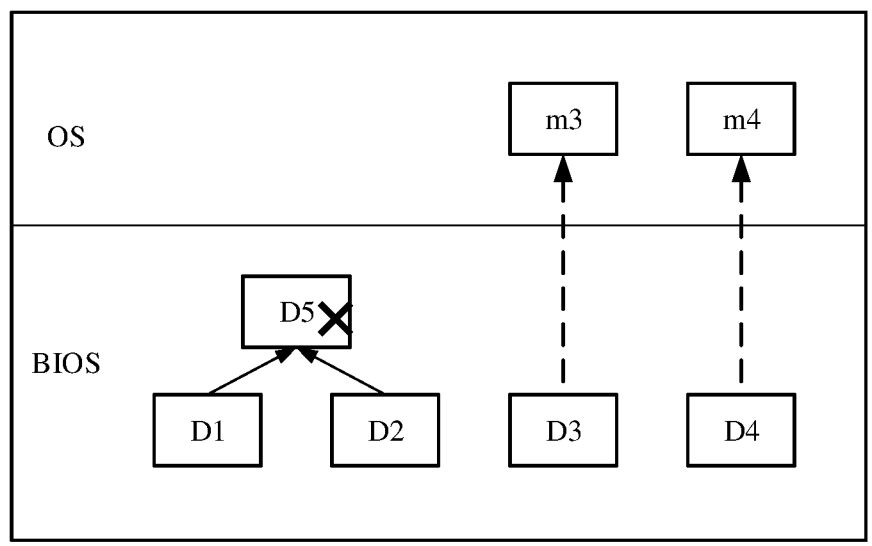
FIG. 9 is a schematic diagram of another mapping relationship between a physical memory space and a memory address according to an embodiment of this application.

As shown in FIG. 6, when the computer apparatus is in the OS state, the physical memory spaces D1 and D2 are in the mirroring relationship with each other, a mirrored memory space corresponding to D1 and D2 is D5, and D5 corresponds to a memory address range m5. In this case, if the identifier of the first mirrored memory space carried in the mirrored memory expansion request in step 701 is D5, as shown in FIG. 8, the computer apparatus in the OS state first performs the offline operation on m5 corresponding to D5. After the offline operation is completed, m5 is removed from the memory address range and is no longer used by the computer apparatus. After the offline operation shown in FIG. 8 is completed, as shown in FIG. 9, the computer apparatus in the BIOS state terminates the mirroring relationship between D1 and D2. In this case, virtual D5 corresponding to D1 and D2 also does not exist.

In addition, after terminating the mirroring relationship, the computer apparatus further needs to switch from the BIOS state to the OS state to avoid affecting normal running of a currently performed service. Details are not described herein.

In addition, a mirrored memory existing in the OS state may be removed by using step 701 to step 704. After the mirrored memory is removed, a memory address range may be re-allocated to one or two of the physical memory spaces by using the following steps 705 and 706, so that the computer apparatus in the OS state can reuse one or two of the physical memory spaces.

Step 705: Generate a memory report message, where the memory report message carries an identifier of the first physical memory space.

After terminating the mirroring relationship between the two physical memory spaces based on step 704, the computer apparatus may generate and store the memory report message. The memory report message carries the identifier of the first physical memory space, and then switches from the BIOS state to the OS state, to reuse the first physical memory space by using the following step 706.

Step 706: Allocate a memory address range to the first physical memory space based on the memory report message.

After switching to the OS state, the computer apparatus obtains the memory report message, and allocates the memory address range to the first physical memory space based on the memory report message.

Step 705 and step 706 are merely for reuse of the first physical memory space in the first physical memory space and the second physical memory space, but this does not constitute a limitation on this embodiment of this application. For example, after terminating the mirroring relationship between the first physical memory space and the second physical memory space, the computer apparatus may reuse the first physical memory space and the second physical memory space by using the foregoing steps 705 and 706.

Figure 10:
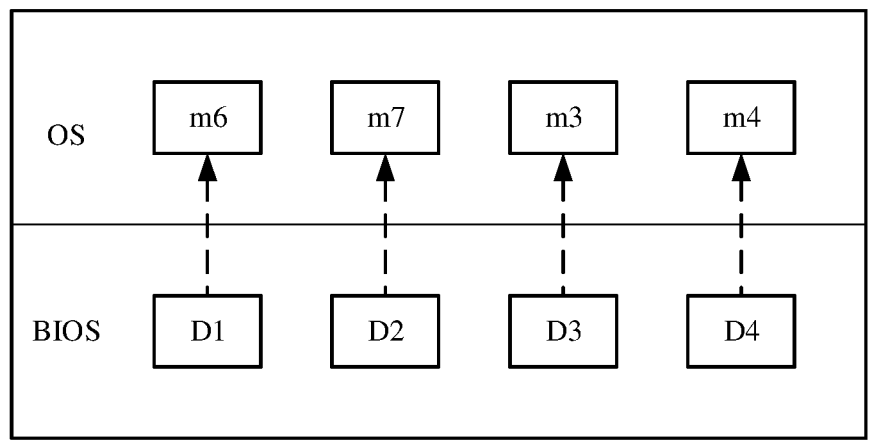
FIG. 10 is a schematic diagram of another mapping relationship between a physical memory space and a memory address according to an embodiment of this application.

As shown in FIG. 10, when the memory report message carries identifiers of D1 and D2, the computer apparatus may reallocate memory address ranges to D1 and D2 after switching from the BIOS state to the OS state. It is assumed that the memory address ranges are m6 and m7. The computer apparatus in the OS state may subsequently reuse D1 and D2.

In addition, after the mirroring relationship between the two physical memory spaces is terminated, if it is determined that the two physical memory spaces are in a same processor or the two physical memory spaces are a segment of consecutive physical memory spaces, the two physical memory spaces may be combined, and then a total memory address range is directly allocated to a combined physical memory space. This is not described in detail.

In this embodiment of this application, the computer apparatus may switch between running a BIOS and running an OS. Therefore, after the computer apparatus is started, if the computer apparatus is currently in the OS state and needs to terminate a configured mirrored memory, the computer apparatus may switch to the BIOS state. Then the computer apparatus terminates the mirroring relationship in the BIOS state, and switches to the OS state again after terminating the mirroring relationship. Similarly, the computer apparatus does not need to be restarted in the entire process. In this way, in a process of reconfiguring the mirrored memory, a service in the OS state does not need to be interrupted, thereby improving flexibility of configuring a mirrored memory.

Figure 11:
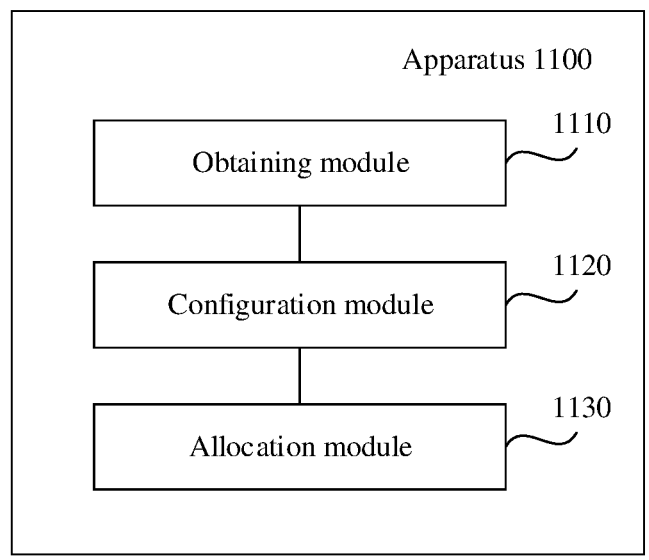
FIG. 11 is a schematic structural diagram of a mirrored memory configuration apparatus according to an embodiment of this application.

FIG. 11 is a schematic structural diagram of a mirrored memory configuration apparatus according to an embodiment of this application. As shown in FIG. 11, the apparatus 1100 includes an obtaining module 1110, a configuration module 1120, and an allocation module 1130.

The obtaining module 1110 is configured to obtain a mirrored memory establishment request. The mirrored memory establishment request carries a first identifier of a first physical memory space and a second identifier of a second physical memory space.

The configuration module 1120 is configured to: switch a current state of the computer apparatus from an operating system OS state to a basic input/output system BIOS state through system interruption; configure the first physical memory space and the second physical memory space to be in a mirroring relationship; obtain an identifier of a mirrored memory space corresponding to the first physical memory space and the second physical memory space; and switch the current state of the computer apparatus from the BIOS state to the OS state.

The allocation module 1130 is configured to allocate a memory address space to the mirrored memory space based on the identifier of the mirrored memory space.

The apparatus is further configured to perform the mirrored memory configuration procedures shown in FIG. 2 and FIG. 7. Specifically, the obtaining module 1110 is configured to perform step 201 in FIG. 2 and step 701 in FIG. 7. The configuration module 1120 is configured to perform steps 202 to 204 in FIG. 2 and steps 702 to 705 in FIG. 7. The allocation module 1130 is configured to perform step 205 in FIG. 2 and step 706 in FIG. 7.

In this embodiment of this application, the computer apparatus may switch between running a BIOS and running an OS. Therefore, after the computer apparatus is started, if the computer apparatus is currently in the OS state and needs to reconfigure a mirrored memory, the computer apparatus may switch to the BIOS state. Then the computer apparatus configures the mirroring relationship in the BIOS state, and switches to the OS state again after configuring the mirroring relationship, to reconfigure the mirrored memory. In the entire process, the computer apparatus does not need to be restarted. In this way, in a process of reconfiguring the mirrored memory, a service in the OS state does not need to be interrupted, thereby improving flexibility of configuring a mirrored memory.

It should be noted that, when the mirrored memory configuration apparatus provided in the foregoing embodiment configures the mirrored memory, division into the foregoing function modules is used as an example for illustration. In actual application, the foregoing functions can be allocated to different function modules and implemented based on requirements, that is, the inner structure of the device is divided into different function modules to implement all or some of the functions described above. In addition, the mirrored memory configuration apparatus provided in the foregoing embodiment belongs to a same concept as the mirrored memory configuration method embodiments. For a specific implementation process, refer to the method embodiments, and details are not described herein again.

Figure 12:
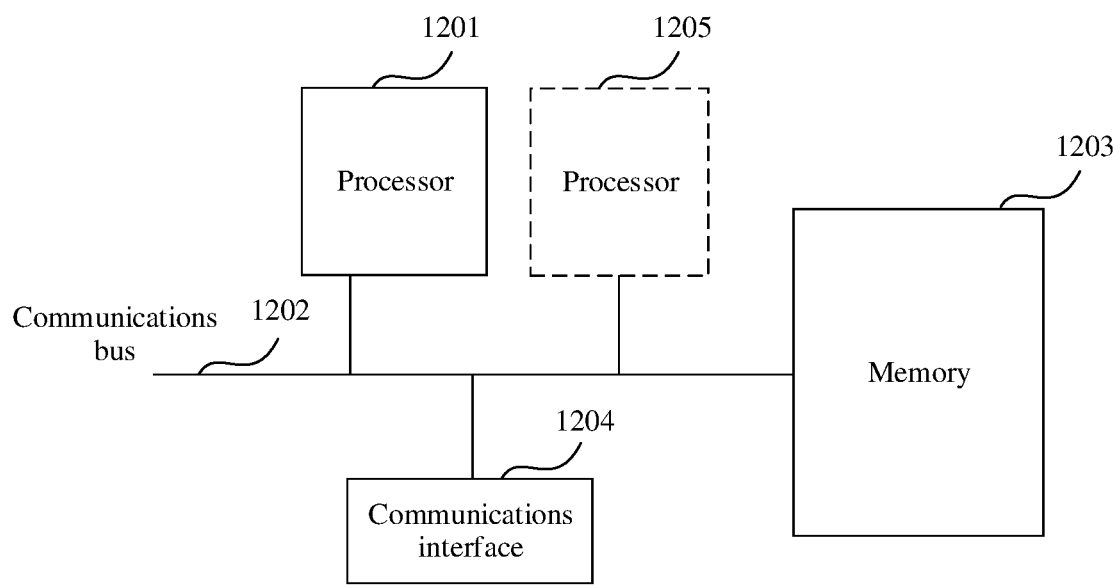
FIG. 12 is a schematic structural diagram of a computer device according to an embodiment of this application.

FIG. 12 is a schematic structural diagram of a computer device according to an embodiment of this application. The computer apparatus in the system shown in FIG. 1 may be implemented by the computer device shown in FIG. 12. Referring to FIG. 12, the computer device includes at least one processor 1201, a communications bus 1202, a memory 1203, and at least one communications interface 1204.

The processor 1201 may be a general-purpose central processing unit (CPU), an application-specific integrated circuit (ASIC), or one or more integrated circuits configured to control program execution of solutions in this application.

The communications bus 1202 may include a channel for transmitting information between the foregoing components.

The memory 1203 may be a read-only memory (ROM) or another type of static storage device that can store static information and an instruction, or a random access memory (RAM) or another type of dynamic storage device that can store information and an instruction, or may be an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray disc, and the like), a magnetic disk storage medium or another magnetic storage device, or any other medium that can be used to carry or store expected program code in a form of an instruction or a data structure and that can be accessed by a computer. However, the memory 1203 is not limited thereto. The memory 1203 may exist independently, and is connected to the processor 1201 by using the communications bus 1202; or the memory 1203 may be integrated with the processor 1201.

The memory 1203 is configured to store program code for executing the solutions in this application, and the processor 1201 controls the execution. The processor 1201 is configured to execute the program code stored in the memory 1203. The program code may include one or more software modules. The computer apparatus in this embodiment of this application may determine, by using the processor 1201 and the one or more software modules in the program code in the memory 1203, data used for application and development.

The communications interface 1204 is any apparatus such as a transceiver, and is configured to communicate with another device or communications network, for example, an Ethernet, a radio access network (RAN), or a wireless local area network (wireless local area networks, WLAN).

In specific implementation, in an embodiment, the computer device may include a plurality of processors, for example, the processor 1201 and a processor 1205 shown in FIG. 13. Each of the processors may be a single-core (single-CPU) processor, or may be a multi-core (multi-CPU) processor. The processor herein may be one or more devices, circuits, and/or processing cores configured to process data (such as a computer program instruction).

The computer device may be a general-purpose computer device or a dedicated computer device. In specific implementation, the computer device may be a desktop, a portable computer, a network server, a personal digital assistant (PDA), a mobile phone, a tablet computer, a wireless terminal device, a communications device, or an embedded device. A type of the computer device is not limited in this embodiment of this application.

All or some of the foregoing embodiments may be implemented by using software, hardware, firmware, or any combination thereof. When software is used to implement the embodiments, the embodiments may be implemented entirely or partially in a form of a computer program product. The computer program product includes one or more computer instructions. When the computer instructions are loaded and executed on a computer, the procedures or functions according to the embodiments of this application are all or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD), a semiconductor medium (for example, a solid-state drive (SSD)), or the like.

A person of ordinary skill in the art may understand that all or some of the steps of the embodiments may be implemented by hardware or a program instructing related hardware. The program may be stored in a computer-readable storage medium. The storage medium may include a read-only memory, a magnetic disk, an optical disc, or the like.

The foregoing descriptions are merely embodiments of this application, but are not intended to limit this application. Any modification, equivalent replacement, or improvement made without departing from the spirit and principle of this application should fall within the protection scope of this application.

What is claimed is:

1. A method, comprising:
   obtaining, by a computer, a mirrored memory establishment request, wherein the mirrored memory establishment request carries a first identifier of a first physical memory space and a second identifier of a second physical memory space;
   in response to obtaining the mirrored memory establishment request, switching, by the computer, a current state of the computer from an operating system (OS) state to a basic input/output system (BIOS) state through system interruption;
   configuring, by the computer, the first physical memory space and the second physical memory space to be in a mirroring relationship;
   obtaining, by the computer, an identifier of a mirrored memory space corresponding to the first physical memory space and the second physical memory space;
   switching, by the computer, the current state of the computer from the BIOS state to the OS state; and
   allocating, by the computer, a memory address range to the mirrored memory space based on the identifier of the mirrored memory space.

2. The method according to claim 1, further comprising:
   obtaining a mirrored memory expansion request, wherein the mirrored memory expansion request carries the identifier of the mirrored memory space;
   performing a first offline operation on the memory address range allocated to the mirrored memory space;
   in response to performing the first offline operation on the memory address range allocated to the mirrored memory space, switching the current state of the computer from the OS state to the BIOS state through system interruption; and
   terminating the mirroring relationship between the first physical memory space and the second physical memory space.

3. The method according to claim 1, wherein before switching the current state of the computer from the OS state to the BIOS state through system interruption, the method further comprises:
   performing a second offline operation on a memory address range corresponding to the first physical memory space.

4. The method according to claim 3, wherein after terminating the mirroring relationship between the first physical memory space and the second physical memory space, the method further comprises:
   generating a memory report message, wherein the memory report message carries the identifier of the first physical memory space; and
   allocating, to the first physical memory space, the memory address range corresponding to the first physical memory space to based on the memory report message.

5. A computer, comprising:

a processor; and a memory storing program code executable by the processor, wherein the program code includes instructions for:

obtaining a mirrored memory establishment request, wherein the mirrored memory establishment request carries a first identifier of a first physical memory space and a second identifier of a second physical memory space;

in response to obtaining the mirrored memory establishment request, switching a current state of the computer from an operating system (OS) state to a basic input/output system (BIOS) state through system interruption;

configuring the first physical memory space and the second physical memory space to be in a mirroring relationship;

obtaining an identifier of a mirrored memory space corresponding to the first physical memory space and the second physical memory space;

switching the current state of the computer from the BIOS state to the OS state; and allocating a memory address range to the mirrored memory space based on the identifier of the mirrored memory space.

6. The computer according to claim 5, wherein the program code further includes instructions for:

obtaining a mirrored memory expansion request, wherein the mirrored memory expansion request carries the identifier of the mirrored memory space;

performing a first offline operation on the memory address range allocated to the mirrored memory space;

in response to performing the offline operation, switching the current state of the computer from the OS state to the BIOS state through system interruption; and terminating the mirroring relationship between the first physical memory space and the second physical memory space.

7. The computer according to claim 5, wherein the program code further includes instructions for:

performing a second offline operation on a memory address range corresponding to the first physical memory space.

8. The computer according to claim 7, wherein the program code further includes instructions for:

generating a memory report message, wherein the memory report message carries the identifier of the first physical memory space; and allocating, to the first physical memory space, the memory address range corresponding to the first physical memory space based on the memory report message.

9. A non-transitory computer readable storage medium storing a program that is executable by a processor, the program including instructions for:

obtaining a mirrored memory establishment request, wherein the mirrored memory establishment request carries a first identifier of a first physical memory space and a second identifier of a second physical memory space;

in response to obtaining the mirrored memory establishment request, switching a current state of a computer from an operating system (OS) state to a basic input/output system (BIOS) state through system interruption;

configuring the first physical memory space and the second physical memory space to be in a mirroring relationship;

obtaining an identifier of a mirrored memory space corresponding to the first physical memory space and the second physical memory space;

switching the current state of the computer from the BIOS state to the OS state; and allocating a memory address range to the mirrored memory space based on the identifier of the mirrored memory space.

10. The non-transitory computer readable storage medium storing the program according to claim 9, wherein the program code further includes instructions for:

obtaining a mirrored memory expansion request, wherein the mirrored memory expansion request carries the identifier of the mirrored memory space;

performing a first offline operation on the memory address range allocated to the mirrored memory space;

in response to performing the offline operation, switching the current state of the computer from the OS state to the BIOS state through system interruption; and terminating the mirroring relationship between the first physical memory space and the second physical memory space.

11. The non-transitory computer readable storage medium storing the program according to claim 10, wherein the program code further includes instructions for: performing a second offline operation on a memory address range corresponding to the first physical memory space.

12. The non-transitory computer readable storage medium storing the program according to claim 11, wherein the program code further includes instructions for:

generating a memory report message, wherein the memory report message carries the identifier of the first physical memory space; and allocating, to the first physical memory space, the memory address range corresponding to the first physical memory space based on the memory report message.

* * * * *